US005321589A

United States Patent [19]
Shinkawa et al.

[11] Patent Number: 5,321,589
[45] Date of Patent: Jun. 14, 1994

[54] APPARATUS FOR CONTROLLING IRRADIATION ANGLE OF A HEADLAMP LIGHT

[75] Inventors: Masaki Shinkawa; Ryouichi Miyakawa; Hiroshi Komachi, all of Tokyo, Japan

[73] Assignee: Harada Kogyo Kabushiki Kaisha, Tokyo, Japan

[21] Appl. No.: 927,148

[22] Filed: Aug. 7, 1992

[51] Int. Cl.$^5$ .............................................. B60Q 1/04
[52] U.S. Cl. ..................................... 362/66; 362/272; 362/286; 362/428
[58] Field of Search .............. 362/66, 272, 273, 282, 362/284, 286, 287, 289, 425, 428, 61

[56] References Cited

U.S. PATENT DOCUMENTS

| | | | |
|---|---|---|---|
| 4,524,407 | 6/1985 | Igura | 362/66 |
| 4,574,334 | 3/1986 | Igura | 362/66 |
| 4,916,587 | 4/1990 | Hirose et al. | 362/273 |
| 5,023,759 | 6/1991 | Eckenrode | 362/273 |
| 5,091,829 | 2/1992 | Hendrischk | 362/273 |
| 5,186,531 | 2/1993 | Ryder et al. | 362/428 |

FOREIGN PATENT DOCUMENTS 0291379 11/1988 European Pat. Off. ............. 362/66
0229628 10/1986 Japan ................................. 362/66

Primary Examiner—Ira S. Lazarus
Assistant Examiner—Y. Quach
Attorney, Agent, or Firm—Koda and Androlia

[57] ABSTRACT

An apparatus that controls the light irradiation angle of a headlamp of vehicles including a feed screw rotatable by a motor, a movable piece that makes a reciprocating motion by the feed screw, an output shaft attached to the movable piece at one end and linked to a headlamp at another end so that the illumination angle of the headlamp is controlled by the advancing and withdrawing motion of the output shaft. The apparatus further includes an irradiation angle initial setting mechanism that is connected to the movable piece so that the irradiation angle can be set manually by adjusting the position of linkage of the headlamp and the output shaft via the movable piece. With this structure, any initial setting of the headlamp angle can be accomplished regardless of the type of vehicles via a compact and simple structure.

2 Claims, 4 Drawing Sheets

APPARATUS FOR CONTROLLING IRRADIATION ANGLE OF A HEADLAMP LIGHT

DETAILED DESCRIPTION OF THE INVENTION

1. Field of the Invention

The present invention relates to a headlamp light irradiation angle control apparatus which allows variable control of the angle of illumination of headlamps such as automobile headlamps, etc.

2. Prior Art

FIGS. 5(a) and 5(b) show the essential sections of a conventional headlamp illumination angle control. As shown in FIG. 5(a), when a sector gear 31 is driven by a motor (not shown) in the direction of arrow A, a spur gear 33 which is formed on the circumferential surface of the corresponding sector shaft 32 rotates so that a rack 34 engaged with the spur gear 33 moves in the direction of arrow B. This rack 34 is provided on an output shaft 36 by stoppers 35. Accordingly, when the rack 34 moves, the output shaft 36 also moves in the direction of arrow B. As a result, one end of the headlamp (not shown) which is linked to the tip end of the output shaft 36 is pushed and pulled so that the angle of illumination of the headlamp is changed.

On the other hand, the initial illumination angle of the headlamp is set by changing the position of engagement between the screw 36a of the output shaft 36 and the screw provided on the headlamp (not shown). This is done by rotating the top part 40a of an attachment 40, which is fastened to the base of the output shaft 36 as shown in FIG. 5(b) with, for example, with a screwdriver.

Furthermore, the attachment 40 and the output shaft 36 are also rotated from inside the vehicle by inserting, for example, a screwdriver through an operating port 43 formed in the side of the case cover 42 and rotating a gear plate 41 which is securely fixed to the attachment 40.

In FIG. 5, numeral 37 is a case wall, 38 is a flange formed on the case wall, and 39 is an O-ring.

PROBLEMS IN PRIOR ART WHICH THE PRESENT INVENTION SOLVES

The following problems, however, have been encountered in the conventional apparatus described above.

First, since the sector shaft 32 and the output shaft 36 are installed so that their axes cross each other, the assembly and adjustment of the spur gear 33 and rack 34 are difficult. Furthermore, the face width required for the rack 34 and the face width required for the spur gear 3 directly affect the required assembling dimensions. Accordingly, it is difficult to make the apparatus compact. Moreover, since the gear plate 41 in the initial (illumination angle) setting section is formed separately from the attachment 40, the number of components increases accordingly, resulting in that the amount of necessary assembly work also increases. In addition, since the initial setting cannot be performed unless a screwdriver, for example, is used, the initial setting (of the illumination angle) operation tends to be complex.

Accordingly, the object of the present invention is to provide a headlamp illumination or irradiation angle control apparatus that offers such advantages that the output shaft and other components can be easily and securely assembled, the initial setting which is to set the angle of illumination by rotating the output shaft can be modified so as to suite any type of vehicle, there are no particular dimensional restrictions to the apparatus thus allowing the apparatus to be compact, the initial setting operation can be performed very simply without using any tool even in the case in which the angle setting operation is performed from inside the vehicle, and the number of components used in the apparatus can be less, thus reducing the amount of assembly work.

MEANS TO SOLVE THE PROBLEMS

In order to solve the problems and achieve the object, the following means is taken in the present invention:

In particular, the apparatus of the present invention includes a feed screw rotated by the transmitted rotational force of a motor, a movable piece installed so that the movement of the feed screw causes the movable piece to make a reciprocating motion, an output shaft mounted to and in parallel to the feed screw so that the feed screw can make an advancing and withdrawing motion via the movement of the movable piece, a headlamp linked to the end of the output shaft so that the angle of illumination is controlled to change via the advancing and withdrawing motion of the output shaft, and an initial setting mechanism which is installed so that the initial angle of illumination of the headlamp can be set beforehand by an adjustment of the position of connection of the headlamp and the output shaft that is effected via a manual operating section t rotate the output shaft.

In the above structure, the manual operating section comprises a dial type operating part that is partially exposed to the outside of the case cover so that operation from the outside can be accomplished, and an operating force transmission gear, that is formed integrally on the dial type operating part.

In addition, the manual operating section can be structured with a gear part that can be rotated from the outside and formed integrally on the outside circumferential surface of an attachment which is fastened to the output shaft.

EFFECT OF THE INVENTION

As a result of the above-described structure, the following effects are obtained:

Since the feed screw, which is rotated by the transmitted rotational force of a motor, and the output shaft are parallel in their axial directions, they can be installed from the same direction. As a result, the problems seen in the conventional apparatus which are that the assembly and adjustment of the spur gear and the rack is difficult can be solved, and the output shaft and other components can be easily and assuredly assembled.

Furthermore, the movable piece has through holes that allow the feed screw and the output shaft to be inserted independently. Accordingly, the initial setting that is to set the angle of illumination by rotating the output shaft can be modified in accordance with the type of the vehicle. In other words, appropriate modification can be effected via a screw connection using a threaded area formed at the tip of the output shaft or by means of a screw connection using threads formed in the area where the output shaft passes through the movable piece, etc.

Moreover, since a motive force is transmitted to the output shaft as a result of the relationship between the feed screw and the movable piece, the problems seen in the prior art that required expanded dimensions on the face width of the rack, etc., are eliminated. Accordingly, there are no particular dimensional restrictions on the apparatus, and the apparatus can therefore be made compact.

Since the apparatus includes the initial setting mechanism that uses a manual operating section which comprises the dial type operating part and the operating force transmission gear so that the initial angle of illumination of the headlamp is set beforehand manually by rotating the output shaft. Accordingly, the initial setting can be accomplished under a low load, and there is no need to use a tool even in the case that the angle setting operation is performed from inside the vehicle, and the initial setting operation is extremely simple.

Furthermore, the manual operating section can be made up of a gear part that can be rotated from outside and provided integrally on the outside circumferential surface of an attachment fastened to the output shaft, the number of components required is reduced, and the amount of assembly work is also reduced.

EMBODIMENT

FIG. 1 illustrates a part of the disassembled headlamp illumination angle control apparatus according to one embodiment of the present invention. FIG. 2 illustrates the remaining part of the headlamp illumination angle control apparatus of the embodiment.

In FIGS. 1 and 2, numeral 1 is a motor. The rotational force of this motor 1 is transmitted from the worm gear 1a of the motor 1 to a sector gear 4 via two-step speed reduction gears 2 and 3. The rotational force transmitted to the sector gear 4 is further transmitted to worm shaft 4a, that is used as a "feed screw". The worm shaft 4a is integrally fastened to the sector gear 4 and is screw-engaged with a worm shaft hole 5a that is provided in a movable piece 5. Accordingly, when the worm shaft 4a rotates, the movable piece 5 is moved in a reciprocating fashion in the axial direction of the worm shaft 4a as indicated by arrow X. The movable piece 5 is provided also, in another part thereof, with an output shaft hole 5b of a simple cylinder shape. An output shaft 6 is inserted into this output shaft hole 5b. Both ends of the output shaft 6 are checked by stoppers 7 and 8. In other words, the output shaft 6 is provided on the movable piece 5 so as to be parallel to the worm shaft 4a and, in addition, be rotatable about its own axis but not slidable in its axial direction. The bottom end of the output shaft 6 as shown FIG. 2 is provided with male screw threads 6a. The male screw threads 6a engage with female screw threads 10a provided at one end of a headlamp 10. The headlamp 10 can rotate in the direction of arrow Y about a supporting part 10b which is installed on the other end of the headlamp 10. Accordingly, the angle of illumination of the headlamp 10 is controlled via the advancing and withdrawing motion of the output shaft 6 in its axial direction that is indicated by arrow X. The initial angle of illumination of the headlamp 10 can be set via the manual operating section of an initial setting mechanism.

More specifically, the manual operating section is referred to by numeral 11 which is shown in the upper part of FIG. 1 and consists of a two-step gear. The two-step gear 11 has a large-diameter first step and a small-diameter second step. The large-diameter first step is a dial type operating part 11a with a part of which exposed to the outside of an exposing opening 16b formed in the case cover 16 so that operation of the operating part from the outside can be done. It is preferable to have, for example, a knurly-finish on the dial type operating part 11a so that operation can be easily done with fingers. The small-diameter second step of the two-step gear 11 is an operating force transmission gear 11b which is formed integrally with the dial type operating part 11a. The operating force transmission gear 11b engages with an output shaft driving gear 12 which is mounted to the base end of the output shaft 6, that is, to the upper end of the output shaft 6.

When the dial type operating part 11a of the two-step gear 11 which is exposed as described above via the manual operating section exposing opening 16b is rotated by hand, the output shaft driving gear 12, which is engaged with the operating force transmission gear 11b, rotates. As a result, the output shaft 6 is also rotated. When the output shaft 6 rotates, the engagement between the male screw threads 6a at the tip of the output shaft 6 (i.e., at the bottom end of the shaft 6 as shown in FIG. 2) and the female screw threads 10a formed at one end of the headlamp 10 changes. In other words, as a result of the rotational movement of the output shaft 6 which is caused by the two-step gear 11 and in the circumferential direction as indicated by arrow V, the position of linkage of the headlamp 10 to the output shaft 6 is adjusted in the axial direction of the shaft 6 as indicated by arrow W. Thus, the initial angle of illumination of the headlamp 10 can be set manually beforehand.

In addition, the initial angle of illumination of the headlamp 10 can be adjusted from the outside of the vehicle with a tool such as a screwdriver, etc. In this case, a tool, for example, a screwdriver, is inserted via a tool insertion hole 16a formed in the case cover 16 until the end of the screwdriver comes into contact with a tool contact part 12a of the driving gear 12 and is then rotated. As a result, the driving gear 12 is rotated so that the output shaft 6 also rotates. The initial angle of illumination of the headlamp 10 is thus set manually in the same manner as describe above.

In FIGS. 1 and 2, numeral 14 is a boss part installed on the case wall 13, and 15 is an O-ring.

FIGS. 3(a) and 3(b) are a perspective view and a cross sectional view, respectively, of the essential portions (two portions) of the embodiment. As shown in FIG. 3(a), when the sector gear 4 rotates in the direction of arrow M, the movable piece 5 moves in a reciprocating fashion in the direction of arrow N as a result of the rotation of the worm shaft 4a. Furthermore, as shown in FIG. 3(b), when the dial type operating part 11a of the two-step gear 11, which is used as a manual operating section exposed to the outside of the exposing opening 16b formed in the case cover 16, is rotated, the output shaft 6 also rotates due to the rotational force transmitted via the operating force transmission gear 11b and the driving gear 12.

FIG. 4 shows a cross section of a modified initial setting mechanism. In FIG. 4, numeral 20 is an attachment, 21 is a gear portion, 22 is a driving gear of a bevel gear shape, 22a is a tool contact, 23 is an insertion hole, and 26 is a case cover. As seen from FIG. 4, the bevel gear shape driving gear 22 is the manual operating section of this modified initial setting mechanism, whereby the bevel gear shape gear portion 21 is formed as an integral part of the circumferential surface of the attachment 20 which is mounted to the output shaft 6 and is rotatable from the outside via the insertion hole 23. The insertion hole 23 allows the fingers and tools to be inserted from the outside.

Next, the operation of the embodiment constructed as described above will be described:

Since the axial directions of the worm shaft 4a (used as a feed screw which is rotated by the rotational force transmitted from the motor 1) and the output shaft 6 are parallel, these parts can be assembled from the same direction. As a result, the problems seen in the prior art which include a difficulty in assembly and adjustment of the spur gear 33 and rack 34, etc. are solved, and the output shaft 6 and other components are easily and assuredly assembled.

Furthermore, the movable piece 5 has two holes 5a and 5b which allow the independent insertion of the worm shaft 4a and the output shaft 6. Accordingly, the initial setting that is to set the angle of illumination by rotating the output shaft 6 can be modified so as to suit any design of the vehicle, etc. More specifically, one modifications can be made at the screw connection effected by the threaded area formed at the tip of the output shaft 6 and at the screw connection effected by the threads formed in the area where the output shaft 6 passes through the movable piece 5.

Moreover, since a motive force is transmitted to the output shaft 6 as a result of the relationship between the worm shaft 4a and the movable piece 5, the problems of the prior art which requires expanded dimensions on the face width L of the rack 34, etc., are eliminated. Accordingly, no particular dimensional restrictions are required for the apparatus, and the apparatus can therefore be made compact.

Furthermore, since the apparatus of the present invention includes an initial setting mechanism which is, for example, installed so that the initial stage of illumination of the headlamp 10 can be set beforehand manually by rotating the output shaft 6 via a two-step gear 11 (as a manual operating part) that is made up of the dial type operating part 11a and the operating force transmission gear 11b, the initial setting of the headlamp angle can be accomplished under a light load. Thus, there is no need to use a tool when the headlamp angle is changed from the inside of the vehicle. Accordingly, the initial setting operation is extremely simple.

Moreover, the driving gear 22 is constructed by forming a gear part 21 (which can be rotated from the outside) as an integral part of the outside circumferential surface of the attachment 20 that is mounted to the output shaft 6 and is used as the manual operating section, therefore, fewer components are required and the amount of assembly work is small.

The present invention is not limited to the embodiments described above. It goes without saying that various modifications are possible as long as there is no departure from the spirit of the invention.

ADVANTAGE OF THE INVENTION

As described above, the present invention provides a headlamp illumination angle control apparatus in which the output shaft and other components can be easily and assuredly assembled, the initial setting for setting the angle of illumination by rotating the output shaft can be modified so as to meet any design of the vehicle, etc., no particular dimensional restrictions are required on the apparatus so that the apparatus can be compact, the illumination angle initial setting can be performed very simply without using any tool when such an operation is done from inside the vehicle, the number of components required is small, and the amount of assembly work is reduced.

Figure 1:
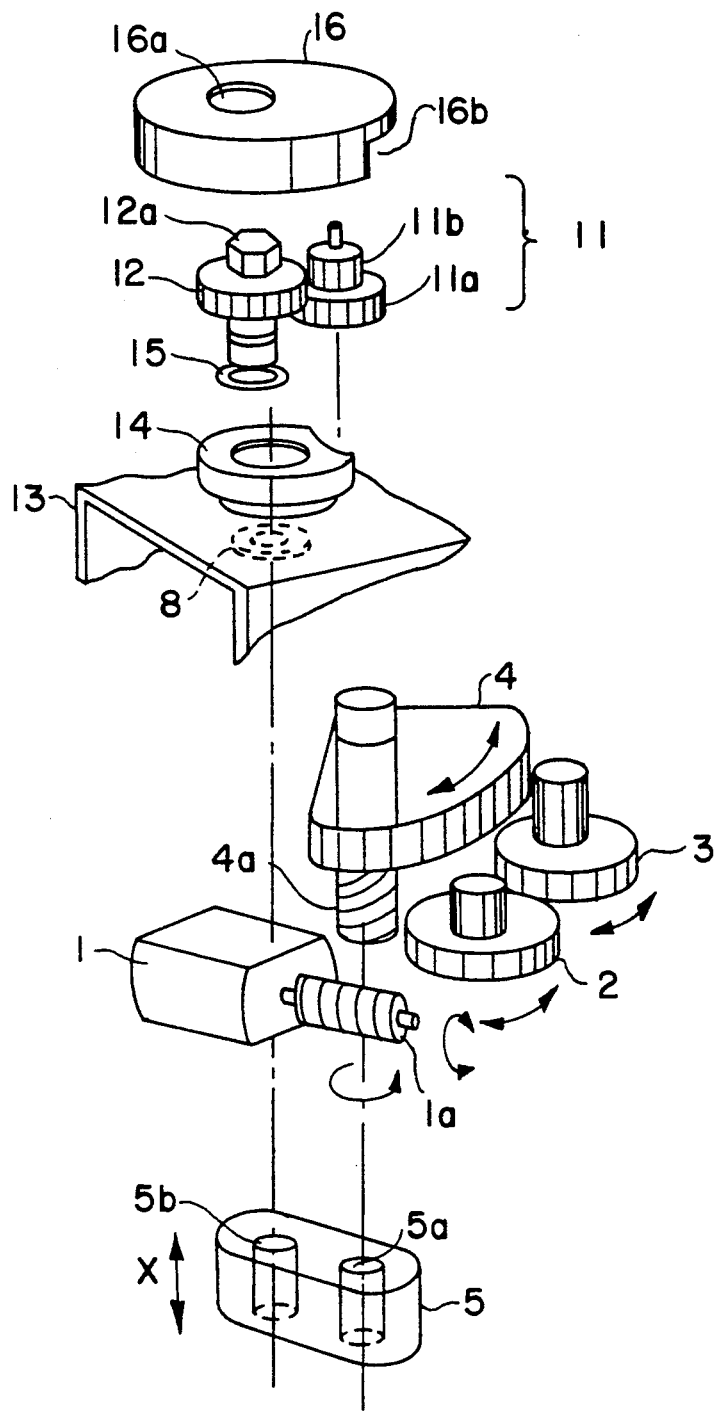
FIG. 1 is a disassembled perspective view of a part of the headlamp illumination angle control apparatus according to one embodiment of the present invention.
Figure 2:
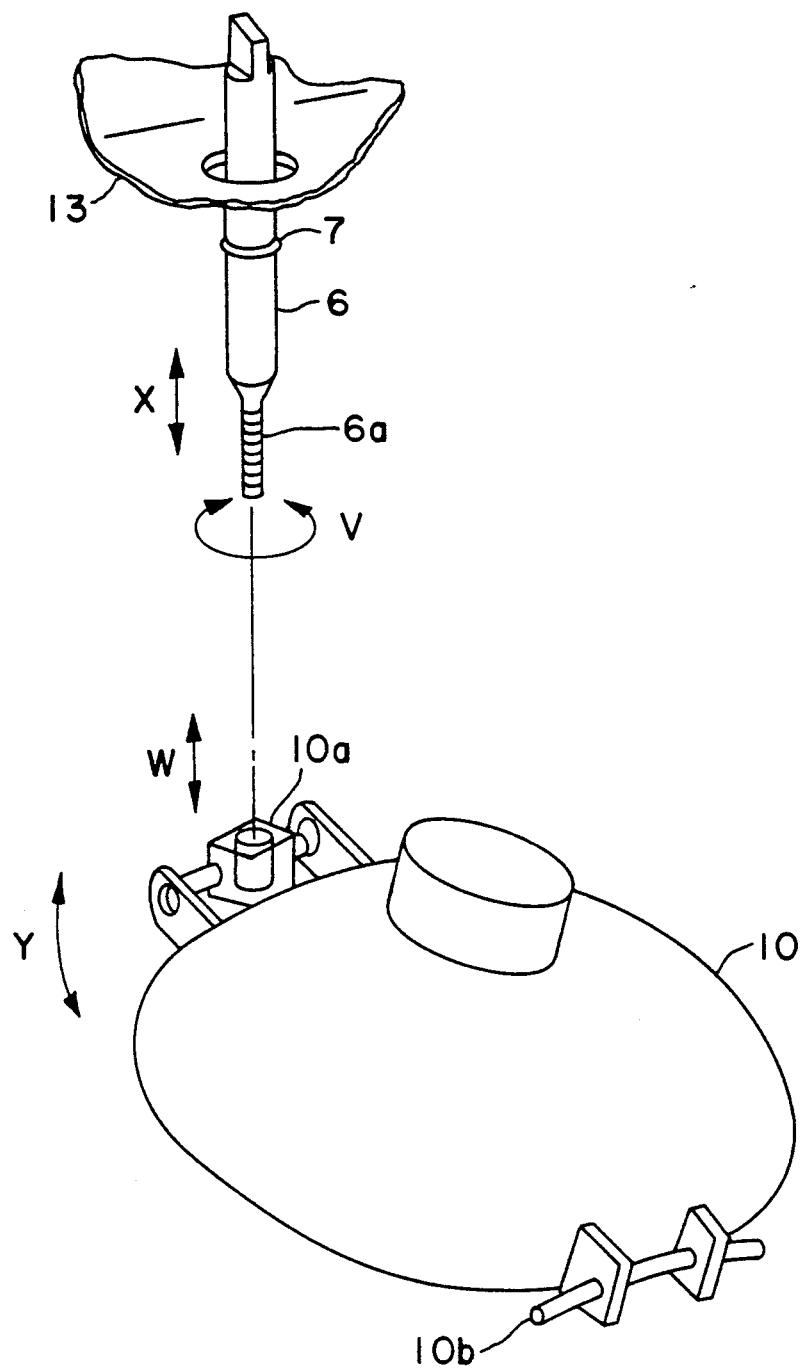
FIG. 2 is a disassembled perspective view of the remaining part of the headlamp illumination angle control apparatus of the embodiment.
Figure 3A:
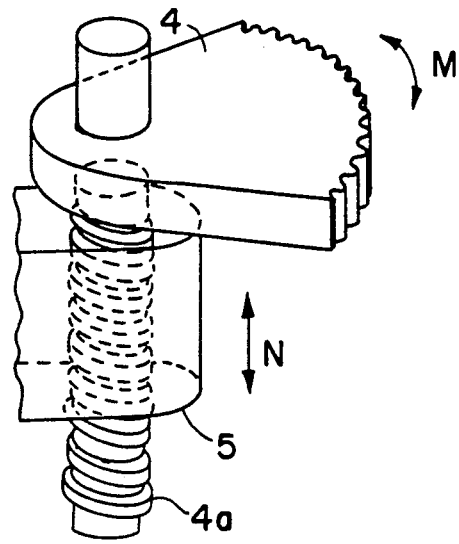
FIG. 3(a) is a perspective view.
Figure 3B:
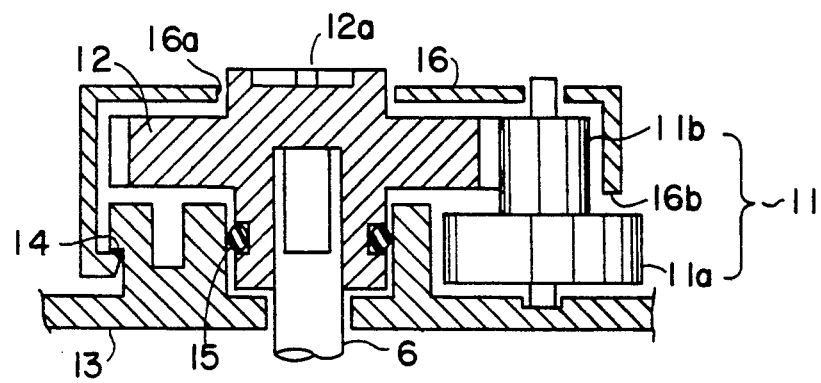
FIG. 3(b) is a sectional view, respectively, showing the essential sections of the headlamp illumination angle control apparatus of the embodiment.
Figure 4:
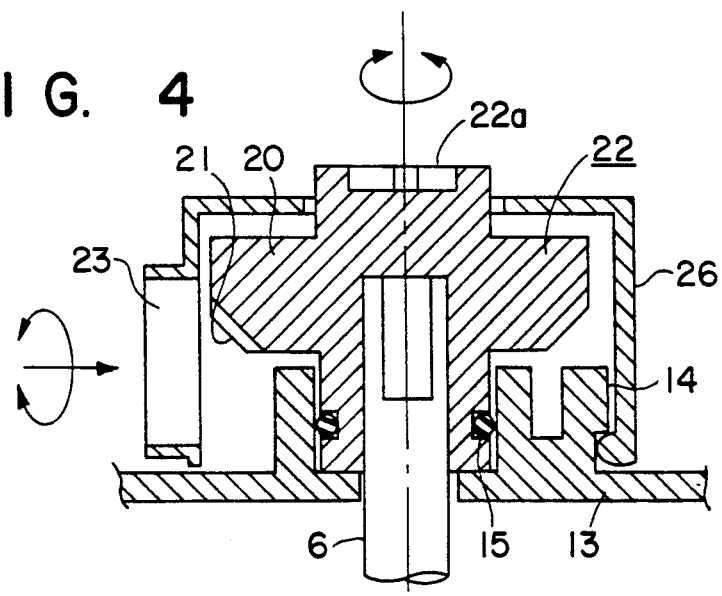
FIG. 4 is a cross sectional view of a modified initial setting mechanism used in the headlamp illumination angle control apparatus of the embodiment.
Figure 5A:
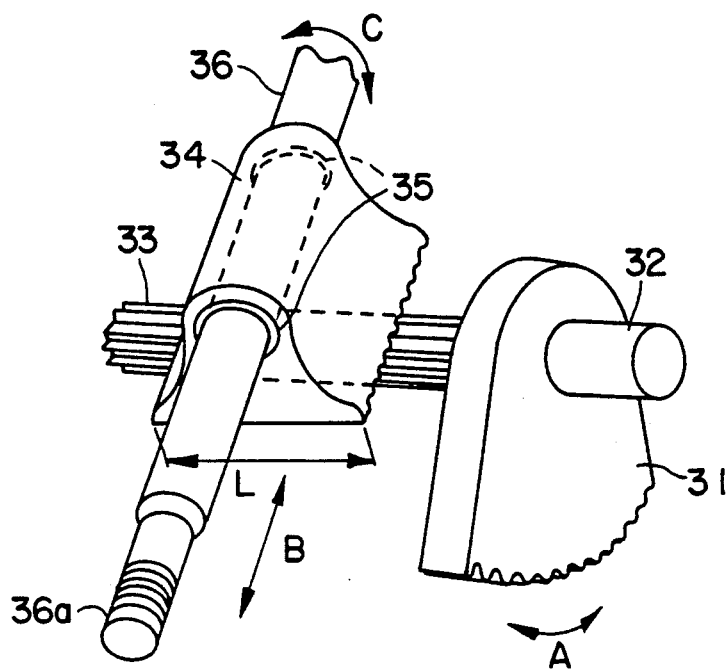
FIGS. 5(a) and 5(b) are perspective and cross sectional views, respectively, of the essential sections of a conventional headlamp illumination angle control apparatus.
Figure 5B:
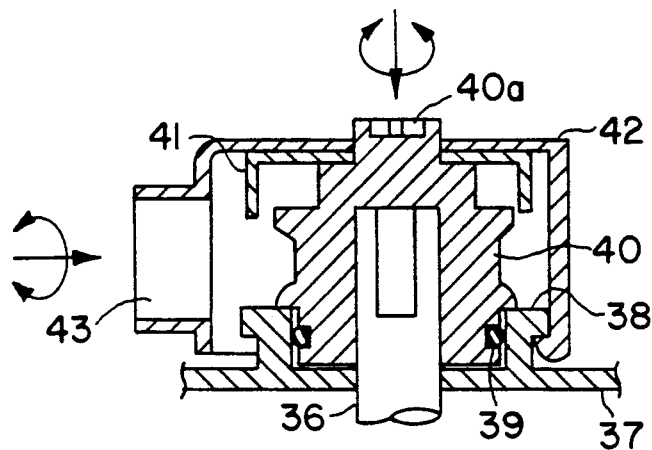

We claim:

1. An apparatus for controlling an irradiation angle of a headlamp comprising:
   a headlamp means pivotally coupled to a vehicle body at one side;
   a first shaft having only a threaded portion adjacent at end of said first shaft, said threaded portion being threadably engaged with a side of said headlamp means opposite said one side to control the irradiation angle of said head lamp means by advancing and withdrawing motions of said first shaft;
   an elongated movable piece, said movable piece having first and second parallel elongated holes provided therethrough, said second elongated hole only having threads and unthreaded portion of said first shaft extending and mounted through said first elongated hole;
   stopper means provided on said unthreaded portion of said first shaft are provided on both top and bottom sides of said movable piece;
   a second shaft threadably engaged with said second elongated hole;
   a sector gear means provided on said second shaft, two step speed reduction gear means engaging with said sector gear means;
   a worm gear means extending transversely to said second shaft and engaging with said two step speed reduction gear means; and
   an electric motor means driving said worm gear means, wherein rotational movement of said worm gear causes said movable piece to move in an axial direction of said second shaft.

2. An apparatus for controlling the irradiation angle of a headlight according to claim 1 further comprising a manual operating means for manually rotating said first shaft, said manual operating means comprising a dial type operating part, via an operating force transmission gear, coupled to said first shaft with a portion of said operating part exposed to an outside of a case cover thereof so that operation from a outside of said cover is possible, and said operating force transmission gear is formed as an integral part of the dial type operating part.

* * * * *